United States Patent
Farley et al.

(10) Patent No.: US 9,521,808 B2
(45) Date of Patent: Dec. 20, 2016

(54) HARVESTER CHAFF PAN ASSEMBLY WITH MOVEABLE DEFLECTOR COMPONENTS

(71) Applicant: CNH Industrial America LLC, New Holland, PA (US)

(72) Inventors: Herbert M. Farley, Elizabethtown, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 79 days.

(21) Appl. No.: 14/548,249

(22) Filed: Nov. 19, 2014

(65) Prior Publication Data
US 2016/0135370 A1    May 19, 2016

(51) Int. Cl.
| | | |
|---|---|---|
| *A01F 29/12* | (2006.01) | |
| *A01F 12/00* | (2006.01) | |
| *A01D 41/12* | (2006.01) | |
| *A01F 12/44* | (2006.01) | |

(52) U.S. Cl.
CPC ............ *A01F 12/00* (2013.01); *A01D 41/12* (2013.01); *A01D 41/1243* (2013.01); *A01F 12/446* (2013.01); *A01F 29/12* (2013.01)

(58) Field of Classification Search
CPC ........ A01F 12/00; A01F 12/40; A01F 12/446; A01F 29/00–29/22; A01D 41/12; A01D 41/1243
USPC ................................ 460/111, 112
See application file for complete search history.

(56) References Cited

U.S. PATENT DOCUMENTS

| | | | | |
|---|---|---|---|---|
| 2,854,046 A | * | 9/1958 | Devorak | A01D 41/1243 56/192 |
| 3,800,803 A | | 4/1974 | Rouse | |
| 3,803,821 A | * | 4/1974 | Peacock | A01D 57/28 56/192 |
| 4,532,941 A | * | 8/1985 | Gauthier | A01F 12/40 241/243 |
| 4,628,946 A | | 12/1986 | De Busscher et al. | |
| 4,921,469 A | * | 5/1990 | Scharf | A01D 41/1243 460/10 |
| 5,569,081 A | * | 10/1996 | Baumgarten | A01D 41/1243 460/1 |
| 5,976,011 A | * | 11/1999 | Hartman | A01D 41/1243 460/111 |
| 6,056,639 A | | 5/2000 | Gryspeerdt et al. | |

(Continued)

FOREIGN PATENT DOCUMENTS

WO        2013/148647 A1     10/2013

*Primary Examiner* — Alicia Torres
*Assistant Examiner* — Adam Behrens
(74) *Attorney, Agent, or Firm* — Peter K. Zacharias; Patrick M. Sheldrake

(57) ABSTRACT

An agricultural harvester includes a grain processing section having a chaff pan with a discharge end adjacent aft steerable wheels for the combine. The main chaff pan has a deflector positioned across its discharge end. The deflector has articulated end sections that are displaceable between a first position where they are fully deployed to direct chaff towards the discharge end and a second position where they deflect to clear the steerable wheels adjacent their steering limits. Either a lost motion mechanism or direct abutment device is connected to the end sections so that they are actuated only adjacent the steering limits of the wheels.

19 Claims, 4 Drawing Sheets

(56) References Cited

U.S. PATENT DOCUMENTS

| | | | |
|---|---|---|---|
| 6,554,701 B1 * | 4/2003 | Wolters | A01D 41/1276 460/101 |
| 6,582,298 B2 * | 6/2003 | Wolters | A01D 41/1243 460/103 |
| 7,220,179 B2 | 5/2007 | Redekop et al. | |
| 7,544,126 B2 | 6/2009 | Lauer et al. | |
| 7,559,833 B2 * | 7/2009 | Isaac | A01D 41/1243 460/111 |
| 7,574,851 B1 | 8/2009 | McLean et al. | |
| 8,585,475 B2 * | 11/2013 | Isaac | A01F 12/40 460/111 |
| 2002/0072400 A1 * | 6/2002 | Foth | A01F 12/40 460/112 |
| 2005/0282602 A1 * | 12/2005 | Redekop | A01F 12/40 460/112 |
| 2007/0026915 A1 * | 2/2007 | Anderson | A01F 12/40 460/112 |
| 2008/0207288 A1 * | 8/2008 | Isaac | A01F 7/06 460/111 |
| 2008/0268927 A1 * | 10/2008 | Farley | A01D 41/1243 460/111 |
| 2009/0005137 A1 * | 1/2009 | Isaac | A01D 41/1243 460/111 |
| 2009/0088231 A1 * | 4/2009 | Murray | A01D 41/1243 460/111 |
| 2009/0111548 A1 * | 4/2009 | Landuyt | A01D 41/1243 460/112 |
| 2009/0253474 A1 * | 10/2009 | Isaac | A01D 41/1243 460/111 |
| 2009/0325659 A1 * | 12/2009 | Overschelde | A01D 41/1243 460/112 |
| 2011/0093169 A1 * | 4/2011 | Schroeder | A01D 41/1243 701/50 |
| 2011/0130181 A1 * | 6/2011 | Roberge | A01D 41/1243 460/111 |
| 2011/0237316 A1 * | 9/2011 | Isaac | A01D 41/1243 460/111 |
| 2013/0095899 A1 * | 4/2013 | Knapp | A01D 41/127 460/111 |
| 2013/0324199 A1 * | 12/2013 | Roberge | A01D 41/1243 460/111 |
| 2014/0031096 A1 * | 1/2014 | Isaac | A01D 41/1243 460/111 |
| 2014/0080555 A1 | 3/2014 | Wagner et al. | |
| 2014/0096498 A1 * | 4/2014 | Estock | A01D 43/06 56/192 |
| 2014/0128133 A1 | 5/2014 | Claerhout | |
| 2014/0302897 A1 * | 10/2014 | Isaac | A01D 41/1243 460/111 |
| 2015/0011274 A1 * | 1/2015 | Murray | A01D 41/1243 460/111 |

* cited by examiner

HARVESTER CHAFF PAN ASSEMBLY WITH MOVEABLE DEFLECTOR COMPONENTS

BACKGROUND OF THE INVENTION

1. Field of the Invention

The present invention relates to agricultural harvesters such as combines, and, more particularly, to chaff pans incorporated in the harvester crop processing section.

2. Description of the Related Art

An agricultural harvester known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or chaff pan assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or chaff pan are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

In the quest for efficiency in the use of such harvesters, the machine size has increased significantly. A larger combine size necessitates larger and wider wheels to ensure the appropriate unit pressure on the soil. While necessary for supporting the larger combines, the steerable wheels on the combine, which are usually the aft wheels, can interfere with the chaff pan assembly that has a discharge end adjacent the rear steerable wheels. Certain governmental regulations require a minimum turning radius so as to comply with maneuverability of agricultural equipment both on and off the field. With such an arrangement, the turning limit for the steerable wheels can cause interference with the chaff pan assembly components.

Accordingly, what is needed in the art is an effective way to prevent interference between steerable combine wheels and the chaff pan assembly components.

SUMMARY OF THE INVENTION

The present invention seeks to eliminate the interference between steerable combine wheels and the crop processing mechanism.

In one form, the invention is a chaff pan for an agricultural combine having steerable wheels. The harvester has a linkage connected to steerable wheels of the harvester and the chaff pan includes a main chaff pan having oscillating elements for propelling chaff towards a discharge end adjacent the harvester steerable wheels, the steerable wheels being pivotable to a turning limit adjacent the discharge end of the main chaff pan. A deflector is connected across the discharge end of the main chaff pan, the deflector having articulated end sections displaceable between a first position fully deployed to guide chaff towards the discharge end and a second position where they clear the steerable wheels. A linkage is connected between the steerable wheels and the deflector end sections and arranged so that normal steering movements do not displace the deflector end sections to the second position and steering movements adjacent the wheel turning limit displace the deflector end section towards the second position.

In another form, the invention is embodied in a harvester including a frame. Wheels are mounted to the frame for ground movement and an aft pair of wheels is steerable to direct movement of the harvester. The harvester includes a crop processing section including a main chaff pan having oscillating elements for propelling chaff towards a discharge end adjacent the harvester steerable wheels, the steerable wheels being pivotable to a turning limit adjacent the discharge end of the main chaff pan. A deflector is connected across the discharge end of the main chaff pan, the deflector having articulated end sections displaceable between a first position fully deployed to guide chaff towards the discharge end and a second position where it is displaced to a position where it clears the steerable wheels. A linkage is connected between the steerable wheels and the deflector end sections and is arranged so that normal steering movements do not displace the deflector component and steering movements adjacent the wheel turning limit displace the deflector end sections towards the second position.

The invention, in another more specific form, is directed to a lost motion linkage incorporated in the above chaff pan and harvester between the deflector end sections and steerable wheels.

An advantage of the present invention is that larger harvesters may be employed in the field without impairing maneuverability.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
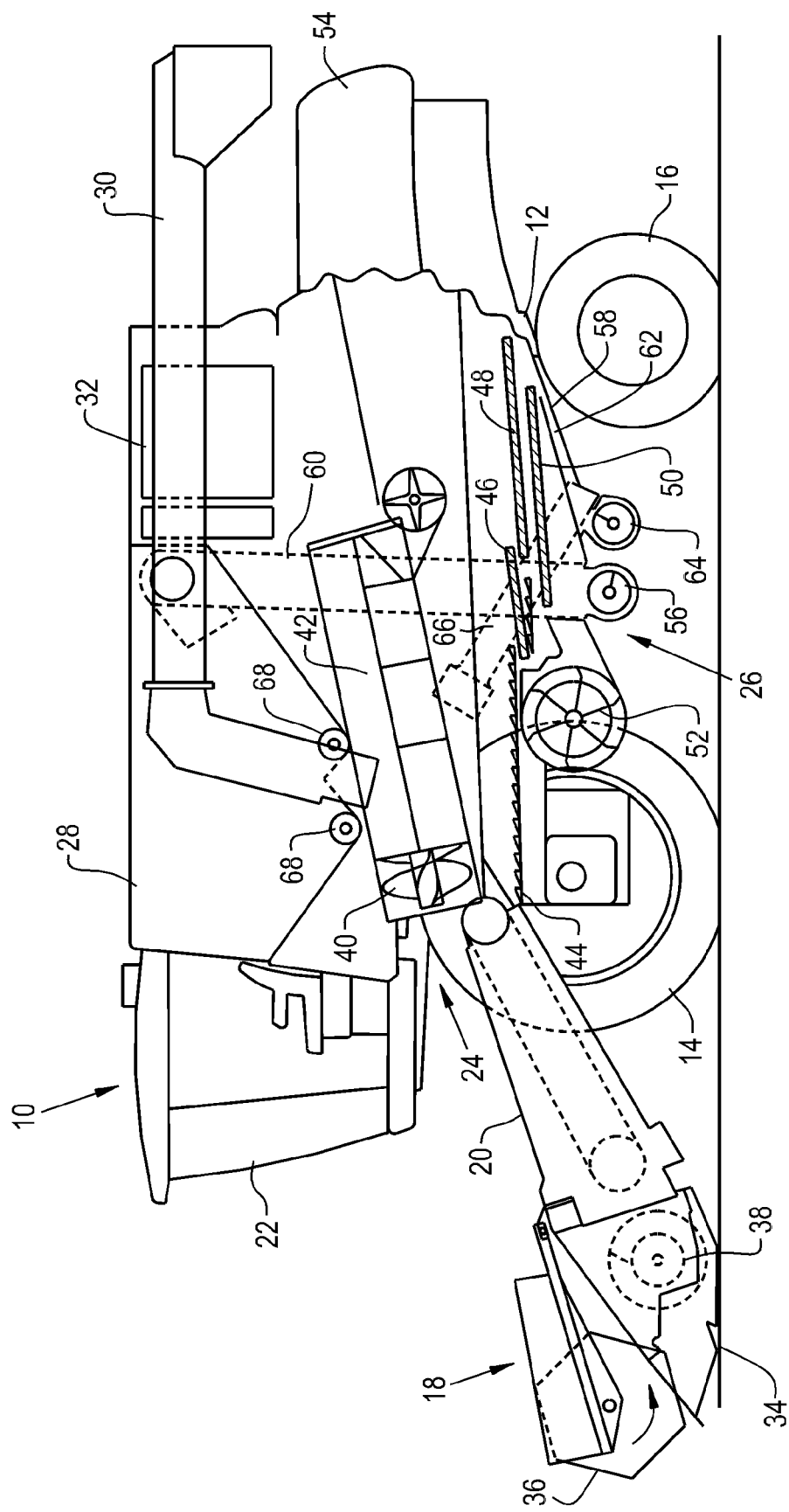
FIG. 1 is a side view of an embodiment of an agricultural harvester in the form of a combine which may include a chaff pan of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or chaff pan), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
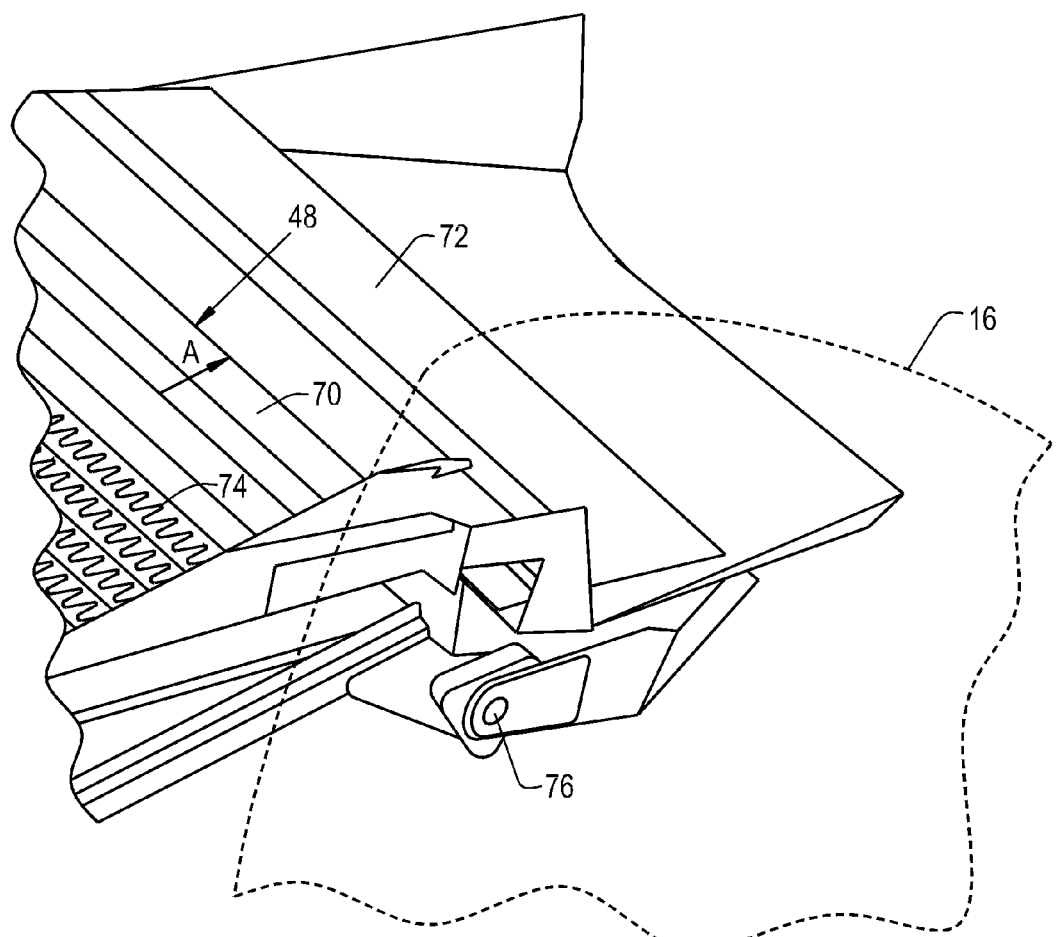
FIG. 2 is a partial perspective view of the combine of FIG. 1 showing a chaff pan assembly and potential interference with the combine steered support wheels.

A more detailed illustration of such an arrangement is shown in FIG. 2 with the chaff pan 48 in chassis 12 adjacent the steerable wheels 16, one of which is shown as a dashed outline. The chaff pin 48 has a main fixed section 70 with a plurality of protrusions 74 that oscillate to move chaff and other material to the aft end of combine 10 for distribution on the field as indicated by arrow A. A deflector 72 is pivotally mounted across the discharge end of main pan 70 at pivot point 76. The deflector 72 is displaceable between an operational position as shown to direct material to the spreader (not shown) and a maintenance position where it is manually pivoted downward to allow access to chaff pan 48.

The wheels 16 are pivoted about a vertical axis 92 (see FIGS. 3 and 4) by appropriate steering knuckles that are connected by tie rods 96 (shown as dashed lines) to a rod 98 connected to a steering actuator 100 so that they are pivoted in unison. The actuator 100 receives hydraulic fluid from a control valve 102 via steering actuator supply conduits 108. Actuator 100 receives pressurized hydraulic fluid from a conduit 104 connected to an appropriate pump 106. The control valve 102 has the usual control inputs for steering and these will not be repeated so as to focus more closely on the present invention.

Figure 3:
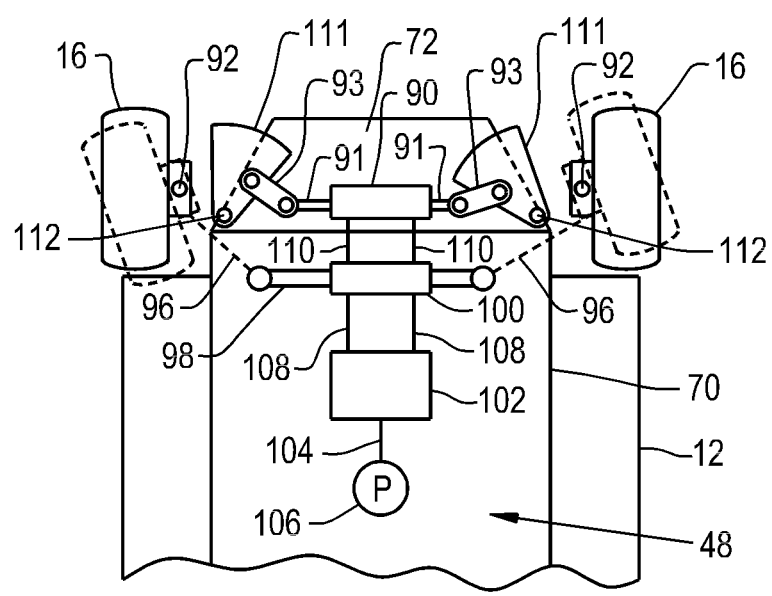
FIG. 3 is a schematic plan view of one system for preventing interference between the chaff pan and wheels of the combine of FIG. 1.

In accordance with the present invention, the deflector 72 is provided with variable geometry to accommodate a shorter turning radius expected in larger equipment. The configuration shown in FIG. 3 shows articulated generally triangular end sections 111 on deflector element 72 that are pivoted about an axis 112 perpendicular to the plane of deflector 72 adjacent its forward end. The end sections are displaceable between a first position where they are deployed outward (see the left side of FIG. 3) to form a generally rectangular shape and a second, retracted position (right side of FIG. 3). Springs (not shown) may be employed to bias end sections 111 to their deployed position.

A set of hydraulic fluid conduits 110 are connected in parallel with conduits 108 and are used to control a hydraulic actuator 90 in synchronism with the movements applied to the steering system for wheels 16. Actuator 90 has an actuating rod 91 connected to end sections 111 by a lost motion connection 93, for example a slot and pin, that does not pivot the end sections 111 during normal steering movements. However, at the range of movements near the steering limits, as shown in FIG. 3 by the wheels 16 in dashed lines, the connection 93 pivots the right end section 111 to its illustrated retracted position where it clears the wheel 16.

The arrangement of the elements shown in FIG. 3 is configured so that normal operational steering movements to not affect the geometry of the deflector end sections 111, but that at extreme movements where there would be interference between the wheels 16 and the end sections 111, cause the end sections for the particular side to be pivoted out of the way of the wheels 16. It should be apparent to those skilled in the art that the lost motion feature may be achieved other than by the connection 93. For example, the end sections 111 may be pivoted by an electrical actuator configured to operate only when the wheels 16 are near their steering limits.

Figure 4:
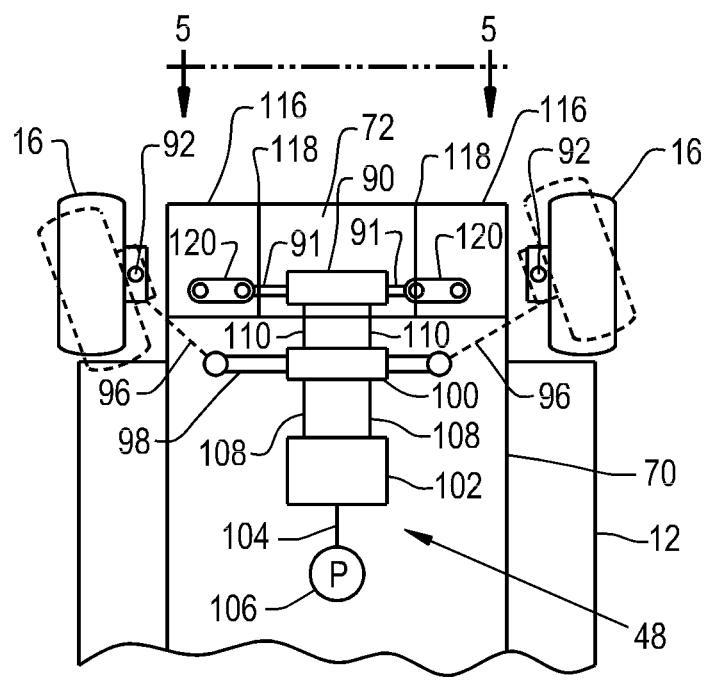
FIG. 4 is a schematic plan view of another system for preventing interference between the chaff pan and wheels of the combine of FIG. 1.
Figure 5:
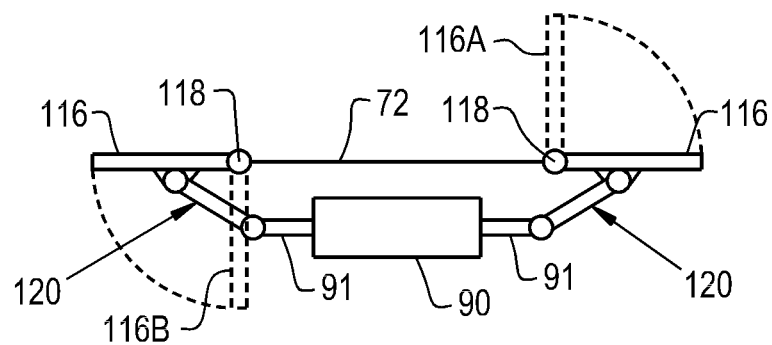
FIG. 5 is an end view of FIG. 4, taken on lines 5-5 of FIG. 3.

The arrangement of FIGS. 4 and 5 shows yet another way to achieve variable geometry for deflector 72. The same reference numbers are used for identical parts as those for FIG. 3. In this configuration, articulated end sections 116 are pivotally mounted to deflector 72 about axes 118 extending in the plane of deflector 72. End sections 116 are connected to rod 91 of actuator 90 by lost motion linkage 120. When the wheels 16 are pivoted adjacent their steering limits, the actuating mechanism displaces the end sections 116 in a manner to swing out of the way of the wheel 16 when the end section 116 is pivoted about its fore and aft axis.

This is shown particularly in FIG. 5 which shows one of the deflector end sections 116 (left) pivoting downward to dashed line 116B. It is also possible to configure the lost motion linkage 120 in such a way that the deflector end sections 116 can be configured to pivot in an upward direction to dashed line 116A. The advantage of pivoting upward is that the deflector continues to operate during tight turning conditions. The movement of the deflector end sections 116 enables deployment in a normal operational position for field harvesting but then retraction from the deployed position when the combine makes an acute turn at the end of the field or when it is maneuvering on a highway.

Figure 6:
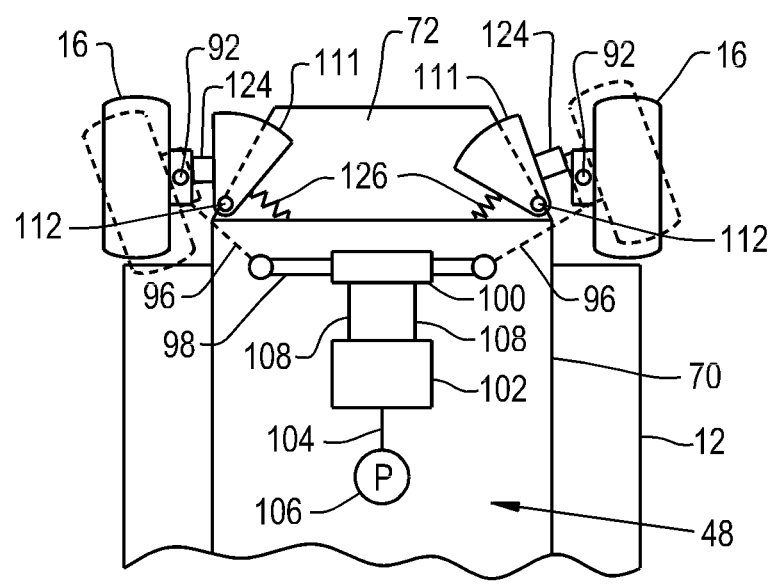
FIG. 6 is a schematic plan view of yet another system for preventing interference between the chaff pan and wheels of the combine of FIG. 1.

FIG. 6 illustrates another embodiment of the invention where like parts are designated with the same reference characters as for FIGS. 3-5. In this configuration, the steering mechanism acts directly on end sections 111 to displace them out of the way of the wheels 16. The end sections 111 are pivotally mounted and biased to their outward position by compression springs 126. It should be noted that tension springs may also be employed with an appropriate lever mechanism. The compression springs 126 may also be used in the embodiments of FIGS. 3-5 to bias the end sections to their deployed positions. Abutment elements 124 are mounted on end sections 111 and configured to extend outward sufficiently so that when either of the wheels 16 is adjacent its steering limit inward, the wheel mechanism abuts end section 111 to urge it towards its retracted position and thus clear the wheel 16.

With either geometry, the objective of achieving larger size equipment with shorter turning radiuses achieved. It should also be noted that while a mechanical lost motion linkage is illustrated; such a lost motion can be provided either hydraulically or electronically. In addition, the deflector end sections may be articulated by a sliding connection as an alternative to a pivoting connection.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A chaff pan for a mobile steerable harvester having steerable wheels, said chaff pan comprising:
    a main chaff pan having oscillating elements for propelling chaff towards a discharge end adjacent the harvester steerable wheels, said steerable wheels being pivotable to a turning limit adjacent the discharge end of said main chaff pan;
    a deflector connected across the discharge end of said main chaff pan, said deflector having articulated end sections displaceable between a first position fully deployed to guide chaff toward the discharge end of said main chaff pan and a second position where they are displaced to a position where they clear the steerable wheels; and,
    a linkage connected between said steerable wheels and said deflector end sections and arranged so that normal steering movements do not displace said end sections to said second position and steering movements adjacent the wheel turning limit displace said end sections toward said second position.

2. The chaff pan as claimed in claim 1, wherein said end sections pivot about an axis extending in a plane of said deflector.

3. The chaff pan as claimed in claim 2, wherein said end sections are displaceable between a first position in which they are in the same plane as the deflector and a second position in which they are displaced out of the plane of said deflector to clear the wheels.

4. The chaff pan as claimed in claim 3, wherein the end sections pivot downward to said second position.

5. The chaff pan as claimed in claim 3, wherein the end sections pivot upward to said second position.

6. The chaff pan as claimed in claim 1, wherein said end sections pivot about an axis substantially perpendicular to the plane of said deflector.

7. The chaff pan as claimed claim 6, wherein the end sections each have a triangular configuration, and wherein the end sections are configured to pivot adjacent a forward end of the deflector between the first position in which they are deployed outward and the second position in which they are displaced to a retracted position to clear the wheels.

8. The chaff pan as claimed in claim 7, wherein said linkage comprises abutment elements mounted on said end sections and configured to extend outwardly sufficiently so that when an adjacent one of the steerable wheels is turned inwardly toward its steering limit the abutment element of a repective one of the end sections contacts the adjacent one of the steerable wheels to urge the respective one of the end sections toward its retracted position.

9. The chaff pan as claimed in claim 1, wherein the linkage is a pair of lost motion links interconnected between said end sections and an actuator.

10. The chaff pan as claimed in claim 9, wherein the harvester steering has hydraulic actuation and said chaff pan further comprises a hydraulic actuator interconnected with the hydraulic lines of said harvester steering and responsive to hydraulic movements to track the turning of said steerable wheels, the lost motion linkage being interconnected between the hydraulic actuator and the deflector end sections.

11. A harvester comprising:
a main frame;
a plurality of mobile wheels for guided movement, including a pair of aft steerable wheels;
a steering mechanism for pivoting the steerable wheels to provide directional control of said harvester;
grain processing equipment mounted in said frame and including a main chaff pan for movement of chaff to a discharge end adjacent said steerable wheels;
a deflector connected across the discharge end of the main chaff pan, the deflector having articulated end sections displaceable between a first position fully deployed to guide chaff towards the discharge end of said main chaff pan and a second position where they are displaced to a position where they clear the steerable wheels; and,
a linkage connected between said steerable wheels and the deflector end sections and arranged so that normal steering movements do not displace said end sections to said second position and steering movements adjacent the wheel turning limits displace said end sections toward said second position.

12. The harvester of claim 11, wherein said deflector end sections pivot about an axis extending in a plane of said deflector.

13. The harvester of claim 12, wherein said deflector end sections pivot in an upward direction.

14. The harvester of claim 12, wherein said deflector end sections pivot in a direction downward.

15. The harvester of claim 11, wherein said deflector end sections pivot about an axis substantially perpendicular to a plane of said deflector.

16. The harvester of claim 15, wherein each of the deflector end sections is triangularly shaped, and wherein the deflector end sections are deployable to a first position wherein they form a rectangle with the deflector and a second position wherein at least one of said deflector end sections pivots inwards to clear a repective one of the pair of aft steerable wheels.

17. The harvester of claim 16, wherein said linkage comprises abutment elements mounted on said deflector end sections and configured to extend outwardly sufficiently so that when an adjacent one of the steerable wheels is turned inwardly toward its steering limit the abutment element of a respective one of the deflector end sections contacts the adjacent one of the steerable wheels to urge the repetive one of the deflector end sections toward its retracted position.

18. The harvester claim 11, wherein the linkage is a pair of lost motion links interconnected between said deflector end sections and an actuator.

19. The harvester of claim 18, wherein said steering movements are effected by hydraulic actuation and said chaff pan further comprises a hydraulic actuator interconnected with hydraulic lines of said harvester and responsive to hydraulic movements to track turning of the steerable wheels, the lost motion links being interconnected between the hydraulic actuator and the deflector.

* * * * *